US008378026B2

(12) United States Patent
Lee et al.

(10) Patent No.: US 8,378,026 B2
(45) Date of Patent: Feb. 19, 2013

(54) TRANSPARENT RUBBER MODIFIED STYRENE RESIN AND METHOD FOR PREPARING THE SAME BY CONTINUOUS BULK POLYMERIZATION

(75) Inventors: Byeong Do Lee, Gwangjugwangyeok-si (KR); Young Sub Jin, Seoul (KR); Hwan Seok Park, Anyang-si (KR); Jae Keun Hong, Gunpo-si (KR)

(73) Assignee: Cheil Industries Inc., Gumi-si (KR)

( * ) Notice: Subject to any disclaimer, the term of this patent is extended or adjusted under 35 U.S.C. 154(b) by 209 days.

(21) Appl. No.: 12/360,232

(22) Filed: Jan. 27, 2009

(65) Prior Publication Data

US 2009/0143532 A1 Jun. 4, 2009

Related U.S. Application Data

(63) Continuation-in-part of application No. PCT/KR2007/003891, filed on Aug. 14, 2007.

(30) Foreign Application Priority Data

Aug. 16, 2006 (KR) .................. 10-2006-0077069

(51) Int. Cl.
*C08F 279/02* (2006.01)
*C08F 279/06* (2006.01)
*C08F 212/08* (2006.01)

(52) U.S. Cl. ........... 525/84; 525/80; 525/83; 525/98; 525/227; 525/230; 525/238; 525/242; 525/308; 525/309

(58) Field of Classification Search .......... 525/80, 525/83, 84, 98, 227, 230, 238, 242, 308, 525/309

See application file for complete search history.

(56) References Cited

U.S. PATENT DOCUMENTS

| 5,434,219 A | 7/1995 | Oomura et al. |
| 5,569,709 A | 10/1996 | Sue et al. |
| 5,614,589 A | 3/1997 | Niznik et al. |
| 6,515,072 B2 * | 2/2003 | Hsu ............................ 525/93 |
| 2002/0032282 A1 | 3/2002 | Hsu et al. |

FOREIGN PATENT DOCUMENTS

| GB | 2364706 A | 2/2002 |
| JP | 56-057813 A | 5/1981 |
| JP | 05-331245 A | 12/1993 |
| JP | 2001-31833 A | 2/2001 |
| KR | 10-2003-0031684 A | 4/2003 |
| WO | 95/14058 A | 5/1995 |

OTHER PUBLICATIONS

Extended European Search Report in counterpart European Application No. 07793498, dated Jul. 27, 2009.
International Search Report in counterpart International Application No. PCT/KR2007/003891, mailed on Nov. 19, 2007.

* cited by examiner

*Primary Examiner* — Roberto Rabago
(74) *Attorney, Agent, or Firm* — Summa, Additon & Ashe, P.A.

(57) ABSTRACT

One aspect of the invention relates to a transparent rubber-modified styrenic resin composition. The resin composition comprises about 5 to about 30 parts by weight of a styrene-butadiene rubbery copolymer; and about 0 to about 15 parts by weight of a matrix resin comprising about 20 to about 40 parts by weight of styrenic monomer, about 30 to about 60 parts by weight of unsaturated carboxylic acid alkyl ester monomer and about 0 to about 15 parts by weight of vinyl cyanide monomer; wherein the difference between the refractive index of the rubbery copolymer and the matrix resin is about 0.005 or less and the transparent rubber-modified styrenic resin composition has a haze of about 5% or less as measured by a Nippon Denshoku Haze meter using a 3 mm thick test sample.

19 Claims, 8 Drawing Sheets

TRANSPARENT RUBBER MODIFIED STYRENE RESIN AND METHOD FOR PREPARING THE SAME BY CONTINUOUS BULK POLYMERIZATION

CROSS-REFERENCE TO RELATED APPLICATIONS

This non-provisional application is a continuation-in-part application of PCT Application No. PCT/KR2007/003891, filed Aug. 14, 2007, pending, which designates the U.S. and which is hereby incorporated by reference in its entirety, and claims priority therefrom under 35 USC Section 120. This application also claims priority under 35 USC Section 119 from Korean Patent Application No. 10-2006-0077069, filed Aug. 16, 2006, which is also hereby incorporated by reference in its entirety.

FIELD OF THE INVENTION

The present invention relates to a rubber-modified styrene resin having good transparency, flowability, gloss and impact resistance and a method for continuous bulk polymerization thereof.

BACKGROUND OF THE INVENTION

Acrylonitrile-butadiene-styrene copolymer resin (hereinafter, ABS resin) generally has a good balance of physical properties such as processability of styrene, chemical resistance of acrylonitrile, and flexibility and impact resistance of butadiene, and has an excellent appearance. Therefore, ABS resins have been widely used in automobile parts, electronic articles, sheet belts and the like. However, ABS resins are typically opaque, which limits their use in many applications.

ABS resins are opaque because the refractive index of the matrix resin is different from the refractive index of the dispersed rubber phase. Accordingly, light is refracted at the interface therebetween and light in the visible wavelength region is diffused depending upon the size of the rubber particles.

Generally, polystyrene resin has a high refractive index. In contrast, the dispersed phase (rubber) has a low refractive index due to the butadiene component. Therefore, for the ABS resin to be transparent, the refractive index of the rubber phase should be identical to that of the continuous phase (matrix resin). Further, for the ABS resin to have a good balance of flowability, impact resistance, gloss and transparency, the size of the rubber particles should be adjusted properly and the particle size distribution should be uniform to minimize the diffusion of the light in the visible wavelength region.

Rubber-modified styrenic resin is typically prepared by emulsion polymerization, suspension polymerization, solution polymerization, bulk polymerization, and the like. A disadvantage of emulsion polymerization is that residual emulsifier, electrolyte and coagulating agent can degrade the physical properties of the final products. In suspension polymerization, it can be difficult to control the rubber particle size and to remove an inorganic suspending agent employed during suspension polymerization. For this reason, organic suspending agents have been recently used. However, these organic suspending agents may also remain in the final product, resulting in the decrease of physical properties of the product. Furthermore, emulsion polymerization and suspension polymerization require separate dehydration and drying steps after polymerization, because they employ water as a polymerization medium.

Solution polymerization or bulk polymerization may provide a high-purity product, since they do not require emulsifiers or suspending agents typically employed in emulsion polymerization or suspension polymerization. Further, solution and bulk polymerization have the advantage of low production cost and large-scale production. They are, however, disadvantageous for preparation of transparent rubber-modified styrenic resin, because it is difficult to match the refractive indices between the dispersed phase (rubber) and the continuous phase (matrix resin).

Japanese Patent Laid-open Publication No. 2001-31833 discloses a transparent thermoplastic resin composition produced by adding a specific graft copolymer which contains a rubber component to a resin which does not contain a rubber component melted during continuous bulk polymerization followed by mixing the blend to adjust refractive index. The rubber and resin of the resultant product may have similar refractive index values and the product may have increased mechanical properties. The process, however, is not economically feasible because it requires an additional compounding process and the transparency of the resin composition obtained therefrom may be degraded.

U.S. Publication No. 2002/0032282 discloses a transparent rubber-modified styrenic resin composition with improved chemical resistance and moldability prepared by controlling the specific morphology of rubber particles and specific molecular distribution of the matrix resin in a continuous bulk polymerization to disperse the rubber particles (dispersed phase) into the matrix resin (continuous phase). This resin may have a good balance of flowability and impact resistance; however, the resin also has low transparency because the refractive index is not controlled during the reactions.

In general, conversion rates of monomers even under the same polymerization conditions are different from each other, thereby reducing transparency due to the difference in refractive index.

Accordingly, the present inventors have developed a transparent rubber-modified styrenic resin having excellent flowability, transparency and gloss while maintaining good mechanical properties and a method for continuous bulk polymerization thereof by adjusting the difference of refractive index between a rubber phase (styrene-butadiene rubbery copolymer) and the matrix resin (methylmethacrylate-styrene-acrylonitrile terpolymer) to be about 0.005 or less at each polymerization step.

SUMMARY OF THE INVENTION

The present invention provides a transparent rubber-modified styrenic resin having good transparency, flowability, gloss and impact resistance.

The present invention further provides a method of continuous bulk polymerization for a transparent rubber-modified styrenic resin. The method of the invention includes controlling the difference between the refractive index of a rubbery copolymer and a matrix resin to about 0.005 or less, while providing a substantially uniform particle size distribution so that the transparent rubber-modified styrenic resin may have good transparency and impact strength. The method of the invention can further provide a transparent rubber-modified styrenic resin having good transparency, flowability, gloss and impact resistance using a simple consecutive continuous bulk polymerization without requiring any additional steps to adjust the difference between the refractive index of a rubbery copolymer and a matrix resin to about 0.005 or less.

One aspect of the invention provides a transparent rubber-modified styrenic resin composition which comprises about 5 to about 30 parts by weight of a styrene-butadiene rubbery copolymer; and about 0 to about 15 parts by weight of a matrix resin comprising about 20 to about 40 parts by weight of styrenic monomer, about 30 to about 60 parts by weight of unsaturated carboxylic acid alkyl ester monomer and about 0 to about 15 parts by weight of vinyl cyanide monomer, wherein the difference between the refractive index of the rubbery copolymer and the matrix resin is about 0.005 or less. According to the invention, the transparent rubber-modified styrenic resin composition has a haze of about 5% or less as measured by a Nippon Denshoku Haze meter using a 3 mm thick test sample.

In exemplary embodiments of the invention, the styrene-butadiene rubbery copolymer is a block copolymer or a random copolymer having a bound styrene content of about 5 to about 50%.

Another aspect of the invention provides a method for preparing a transparent rubber-modified styrenic resin by continuous bulk polymerization. The method comprises the steps of (1) polymerizing a reactant mixture comprising styrenic monomer, unsaturated carboxylic acid alkyl ester monomer, vinyl cyanide monomer and styrene-butadiene rubbery copolymer to a point of phase inversion in a first reactor to prepare a first polymerization product, (2) continuously introducing the first polymerization product into a second reactor and polymerizing therein while supplying styrenic monomer or unsaturated carboxylic acid alkyl ester monomer to prepare a second polymerization product, and (3) continuously introducing the second polymerization product into a third reactor and polymerizing therein, while supplying styrenic monomer or unsaturated carboxylic acid alkyl ester monomer to prepare a third polymerization product.

In exemplary embodiments of the invention, the first polymerization product is prepared by polymerizing the reactant mixture in the first reactor at a temperature ranging from about 80 to about 130° C. for about 0.5 to about 2 hours. The second polymerization product is prepared by polymerizing the first polymerization product in the second reactor at a temperature ranging from of about 100 to about 150° C. for about 1.5 to about 3 hours, while supplying about 0 to about 5 parts by weight of styrene monomer or unsaturated carboxylic acid alkyl ester monomer per 100 parts by weight of the reactant mixture. The third polymerization product is prepared by polymerizing the second polymerization product in the third reactor at a temperature ranging from about 110 to about 160° C. for about 1.5 to about 3 hours, while supplying about 0 to about 5 parts by weight of styrene monomer or unsaturated carboxylic acid alkyl ester monomer per 100 parts by weight of the reactant mixture.

In exemplary embodiments of the invention, the third polymerization product may be devolatilized using a devolatilizer to remove unreacted monomers and solvent.

DETAILED DESCRIPTION OF THE INVENTION

Figure 1:
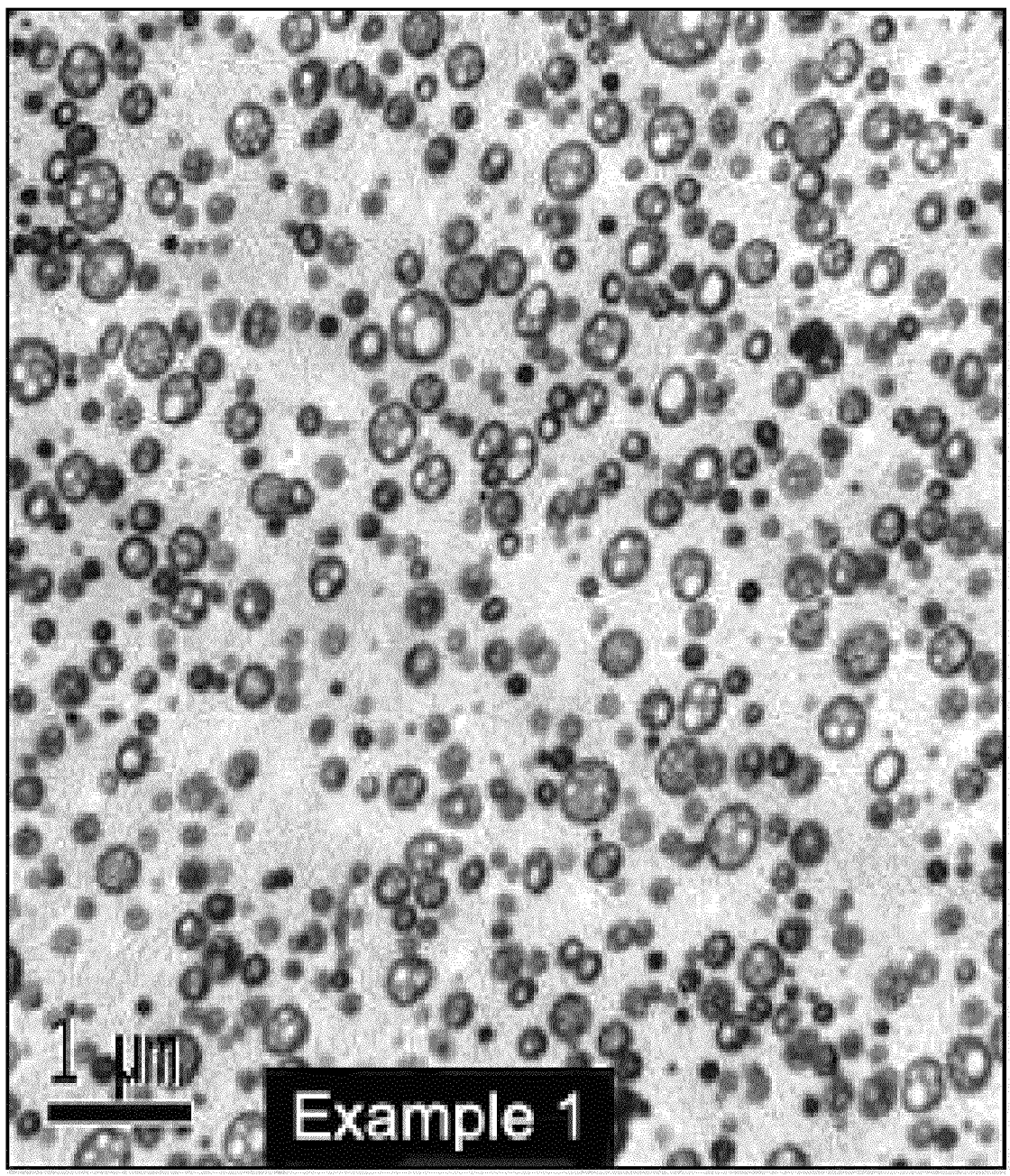
FIG. 1 is an electron micrograph showing particle size and distribution of a transparent resin obtained in Example 1.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Transparent Rubber-Modified Styrenic Resin Composition

One aspect of the invention relates to a transparent rubber-modified styrenic resin composition which comprises a styrene-butadiene rubbery copolymer; and a matrix resin comprising styrenic monomer, unsaturated carboxylic acid alkyl ester monomer and vinyl cyanide monomer The styrenic resin composition comprises about 5 to about 30 parts by weight of a styrene-butadiene rubbery copolymer; and about 0 to about 15 parts by weight of a matrix resin comprising about 20 to about 40 parts by weight of styrenic monomer, about 30 to about 60 parts by weight of unsaturated carboxylic acid alkyl ester monomer and about 0 to about 15 parts by weight of vinyl cyanide monomer.

In exemplary embodiments of the invention, the styrene-butadiene rubbery copolymer may be a block copolymer or a random copolymer having a bound polystyrene content of about 5 to about 50%.

Examples of unsaturated carboxylic acid alkyl ester monomers suitable for use in the present invention may include without limitation methyl methacrylate, ethyl methacrylate, propyl methacrylate, butyl methacrylate, 2-ethylhexyl methacrylate, methyl acrylate, ethyl acrylate, butyl acrylate, 2-ethylhexyl acrylate, and the like. These unsaturated carboxylic acid alkyl ester monomers can be used alone or in combination with one another.

Examples of styrenic monomers suitable for use in the present invention may include without limitation styrene, α-methyl styrene, α-ethyl styrene, p-methyl styrene, vinyl toluene, and the like. These styrenic monomers can be used alone or in combination with one another.

Examples of vinyl cyanide monomers suitable for use in the present invention may include without limitation acrylonitrile, methacrylonitrile, ethacrylonitrile, and the like. These vinyl cyanide monomers can be used alone or in combination with one another.

In accordance with the present invention, the difference between the refractive index of the rubbery copolymer and the refractive index of the matrix resin is about 0.005 or less. Further, the resin composition of the present invention has a haze of about 5% or less, for example about 0.1 to about 3%, as measured by a Nippon Denshoku Haze meter using a 3 mm thick test sample.

The resin composition of the present invention may obtain excellent transparency by lowering the difference between the refractive index of the rubbery copolymer and the refractive index of the matrix resin to about 0.005 or less and lowering the haze value to about 5% or less.

Preparation of Transparent Rubber-Modified Styrenic Resin Composition

Another aspect of the invention provides a novel method for preparing a transparent rubber-modified styrenic resin.

The method comprises the steps of (1) polymerizing a reactant mixture comprising styrenic monomer, unsaturated carboxylic acid alkyl ester monomer, vinyl cyanide monomer and styrene-butadiene rubbery copolymer to a point of phase inversion in a first reactor to prepare a first polymerization product, (2) continuously introducing the first polymerization product into a second reactor and polymerizing the same therein while supplying styrenic monomer or unsaturated carboxylic acid alkyl ester monomer to prepare a second polymerization product, and (3) continuously introducing the second polymerization product into a third reactor and polymerizing the same therein, while supplying styrenic monomer or unsaturated carboxylic acid alkyl ester monomer to prepare a third polymerization product.

In exemplary embodiments of the invention, the first polymerization product is prepared by polymerizing the reactant mixture in the first reactor at a temperature ranging from about 80 to about 130° C. for about 0.5 to about 2 hours. The second polymerization product is prepared by polymerizing the first polymerization product in the second reactor at a temperature ranging from about 100 to about 150° C. for about 1.5 to about 3 hours, while supplying about 0 to about 5 parts by weight of styrenic monomer or unsaturated carboxylic acid alkyl ester monomer per 100 parts by weight of the reactant mixture. The third polymerization product is prepared by polymerizing the second polymerization product in the third reactor at a temperature ranging from about 110 to about 160° C. for about 1.5 to about 3 hours, while supplying about 0 to about 5 parts by weight of styrenic monomer or unsaturated carboxylic acid alkyl ester monomer per 100 parts by weight of the reactant mixture.

The reactant mixture is a rubber-dissolved solution in which the styrene-butadiene rubbery copolymer is dissolved in a mixed solution which comprises styrenic monomer, unsaturated carboxylic acid alkyl ester monomer, vinyl cyanide monomer and a solvent.

In exemplary embodiments of the invention, the rubber-dissolved solution may be prepared by mixing styrenic monomer, unsaturated carboxylic acid alkyl ester monomer, vinyl cyanide monomer and solvent in a dissolving tank to form a mixed solution, and adding styrene-butadiene rubbery copolymer thereto with stirring to dissolve the rubbery copolymer in the mixed solution.

The solvent can be any conventional organic solvent. Examples of the organic solvent suitable for use in the present invention may include, but are not limited to, aromatic solvents such as ethyl benzene, benzene, toluene, xylene, and the like; methyl ethyl ketone, acetone, n-hexane, chloroform, cyclohexane, and the like, and combinations thereof.

The proportion of mixture comprising styrenic monomer, unsaturated carboxylic acid alkyl ester monomer and vinyl cyanide monomer is adjusted to match the refractive index of the styrene-butadiene rubbery copolymer. For example, the difference of refractive index between the rubbery copolymer and the monomer mixtures can be about 0.005 or less.

In exemplary embodiments of the invention, the amount of the styrene-butadiene rubbery copolymer is about 5 to about 30 parts by weight, the amount of the styrenic monomer is about 20 to about 40 parts by weight, the amount of the unsaturated carboxylic acid alkyl ester monomer is about 30 to about 60 parts by weight, and the amount of the vinyl cyanide monomer is about 0 to about 15 parts by weight, per 100 parts by weight of total monomers.

Preparation of a First Polymerization Product

The first polymerization product may be prepared by polymerizing a reactant mixture comprising styrenic monomer, unsaturated carboxylic acid alkyl ester monomer, vinyl cyanide monomer and styrene-butadiene rubbery copolymer in a first reactor.

In the polymerization, thermal polymerization, initiator polymerization using an initiator, or a combination thereof may be performed. Initiator polymerization can be useful for easy control of polymerization conversion within each reactor and thus can be useful for adjusting the refractive index of the product within each reactor.

Examples of initiators suitable for use in the present invention include without limitation organic peroxides such as benzoyl peroxide, cumene hydroperoxide, dicumyl peroxide, t-butylhydroperoxide, and the like; organic peresters such as 1-1-di(t-butylperoxy)cyclohexane, 1,1-bis(t-butylperoxy)-3,3,5-trimethylcyclohexane, 1-1-bis(t-butylperoxy)cyclohexane, and the like; organic peroxycarbonates such as t-amyl(2-ethylhexyl)peroxycarbonate, t-butyl(2-ethylhexyl)peroxycarbonate, D-2-ethylhexyl peroxycarbonate, and the like; and azo compounds such as azobisisobutyronitrile, 1-1-azobis(cyclohexane-1-carbonitrile), 1-t-butylazo-1-cyanocyclohexane, and the like. These initiators can be used alone or in combination with one another. The amount of the polymerization initiator may vary depending upon the kind of initiator used or temperature, and can range from about 0.02 to about 1 parts by weight per 100 parts by weight of total amount of the monomers.

During each polymerization step, a molecular weight controlling agent can be added. Exemplary molecular weight controlling agents suitable for use in the present invention can include without limitation alkyl mercaptans represented by the formula of $CH_3(CH_2)nSH$. For example, n-butyl mercaptan, n-octyl mercaptan, n-dodecyl mercaptan, t-dodecyl mercaptan, and the like may be used.

The first reactor is a continuous stirring tank reactor (CSTR) in which a reactant mixture is introduced into the bottom of the reactor and a polymerized product is discharged from the top of the reactor, which is called a full charge reactor. The polymerization is conducted at a temperature of about 80 to about 130° C. for about 0.5 to about 2 hours. The conversion of monomers in the first reactor is in the range of about 10 to about 30%. The reactant mixture is polymerized to a point of phase inversion to prepare a first polymerization product, followed by transferring the first polymerization product to a second reactor. The mixed solution forms a matrix resin (continuous phase), the conversion rate of which is controlled so that the refractive index of the dispersed phase (rubber) is similar to that of the continuous phase (matrix resin) such that the difference between the refractive indices of the dispersed and continuous phases is about 0.005 or less. Further, the reactant mixture forms stabilized rubber particles in the first reactor, to thereby improve impact strength and physical properties.

Preparation of a Second Polymerization Product

The first polymerization product is continuously added into a second reactor to prepare a second polymerization product.

A continuous stirring tank reactor can also be used as the second reactor. The polymerization is conducted at a temperature of about 100 to about 150° C. for about 1.5 to about 3 hours. The conversion of monomers in the second reactor is in the range of about 40 to about 60%. In the second reactor, styrenic monomer or unsaturated carboxylic acid alkyl ester monomer may be further added to match the refractive index between the rubber (dispersed phase) and the matrix resin (continuous phase). The additional monomers are added taking into account the conversion in the first reactor to match the refractive index of the rubbery copolymer and the matrix resin to thereby improve transparency. The difference between the refractive index of the rubbery copolymer and the matrix resin is about 0.005 or less. The additional monomers can be continuously added into the second reactor using a quantitative pump.

The additional monomers can be added in an amount ranging from about 0 to about 5 parts by weight, for example about 0.1 to about 4 parts by weight, per 100 parts by weight of the reactant mixture. If the amount of the additional monomers is more than about 5 parts by weight, the composition of the matrix resin prepared from the second reactor becomes significantly different from that of the matrix resin prepared from the first reactor, so that it may be difficult to control and match the refractive indices of rubber and matrix.

Preparation of a Third Polymerization Product

The second polymerization product is continuously added into a third reactor to prepare a third polymerization product. The polymerization is conducted at a temperature of about 110 to about 160° C. for about 1.5 to about 3 hours. The conversion of monomers is in the range of about 70% to about 90%. In the third reactor, styrenic monomer or unsaturated carboxylic acid alkyl ester monomer may be further added taking into account the conversion in the second reactor to match the refractive index of the rubber (dispersed phase) and the matrix resin (continuous phase).

The amount of the additional monomers added can range from about 0 to about 5 parts by weight, for example about 0.1 to about 4 parts by weight, per 100 parts by weight of the reactant mixture. The third polymerization product from the third reactor may have high impact strength and good gloss due to stabilized rubber particles and uniform particle size distribution, which can prevent diffused reflection on the surface of a molded article. Accordingly, the refractive index of the rubber phase is similar to that of the matrix phase, so that the third polymerization product may exhibit excellent transparency and physical properties. The difference between the refractive index of the rubbery copolymer and the matrix resin may be about 0.005 or less.

In exemplary embodiments of the invention, the third polymerization product may be devolatilized through a devolatilizer to remove unreacted monomers and solvent.

The invention may be better understood by reference to the following examples which are intended for the purpose of illustration and are not to be construed as in any way limiting the scope of the present invention, which is defined in the claims appended hereto. In the following examples, all parts and percentage are by weight unless otherwise indicated.

EXAMPLES

Example 1

28 parts by weight of styrene monomer, 38 parts by weight of methyl methacrylate monomer, 2 parts by weight of acrylonitrile monomer, 12 parts by weight of styrene-butadiene rubbery copolymer (polystyrene content: 25 wt. %) and 20 parts by weight of ethyl benzene are added into a mixing tank with stirring until the styrene-butadiene rubbery copolymer become completely dissolved. On a basis of 100 parts by weight of an initial mixture (a mixture of monomers and solvent), 0.12 parts by weight of t-butyl (2-ethylhexyl)peroxycarbonate as a polymerization initiator and 0.26 parts by weight of n-dodecyl mercaptan as a molecular weight controlling agent are further added thereto to prepare a raw material solution. The formulation in the monomer mixture is adjusted to provide a refractive index of styrene-methyl methacrylate-acrylonitrile terpolymer (continuous phase (matrix resin)) in a first reactor to match that of the styrene-butadiene rubbery copolymer, (dispersed phase).

The raw material solution is fed into a full charge type continuous stirring tank reactor (full-charge CSTR) as a first reactor. In the first reactor, the polymerization is conducted at a temperature of 85° C. and 120 RPM for 1 hour to prepare a first polymerization product.

The first polymerization product from the first reactor is fed into a continuous stirring tank reactor as a second reactor and polymerized at a temperature of 105° C. and 100 RPM for 2 hours, while continuously adding 0.5 parts by weight of styrene monomer (per 100 parts by weight of the initial mixture) using a quantitative pump to thereby obtain a second polymerization product.

The second polymerization product is fed into a third reactor and polymerized at a temperature of 125° C. and 70 RPM for 2 hours, while continuously adding 2.5 parts by weight of styrene monomer (per 100 parts by weight of the initial mixture) using a quantitative pump to thereby obtain a third polymerization product.

The third polymerization product is fed into a devolatilizer to remove unreacted monomers and solvent therefrom and then pelletized to obtain the final product.

Example 2

Example 2 is prepared in the same manner as in Example 1 except that 30 parts by weight of styrene monomer, 36 parts by weight of methyl methacrylate monomer, 2 parts by weight of acrylonitrile monomer, 12 parts by weight of styrene-butadiene rubbery copolymer (polystyrene content: 25 wt. %) and 20 parts by weight of ethyl benzene are used as an initial mixture. Further, methyl methacrylate monomer is continuously added in the second reactor in an amount of 3 parts by weight (instead of styrene), and the amount of styrene monomer added in the third reactor is changed to 3 parts by weight.

Example 3

Example 3 is prepared in the same manner as in Example 1 except that 21 parts by weight of styrene monomer, 45 parts by weight of methyl methacrylate monomer, 2 parts by weight of acrylonitrile monomer, 12 parts by weight of styrene-butadiene rubbery copolymer (polystyrene content: 15 wt. %) and 20 parts by weight of ethyl benzene are used as an initial mixture. Further, the amount of styrene monomer added in the second reactor is changed to 3 parts by weight, and that of styrene monomer added in the third reactor is changed to 3 parts by weight.

Example 4

Example 4 is prepared in the same manner as in Example 1 except that 23 parts by weight of styrene monomer, 43 parts by weight of methyl methacrylate monomer, 2 parts by weight of acrylonitrile monomer, 12 parts by weight of styrene-butadiene rubbery copolymer (polystyrene content: 15 wt. %) and 20 parts by weight of ethyl benzene are used as an initial mixture. Further, the amount of styrene monomer added in the second reactor is changed to 1 part by weight, and that of styrene monomer added in the third reactor is changed to 2 parts by weight.

Comparative Example 1

Comparative Example 1 is prepared in the same manner as in Example 1 except that no monomer for matching the refractive indices of the matrix resin (continuous phase) and the rubber phase (dispersed phase) is added at the second reactor or the third reactor.

Comparative Example 2

Comparative Example 2 is prepared in the same manner as in Example 3 except that no monomer for matching the refractive indices of the matrix resin (continuous phase) and the rubber phase (dispersed phase) is added at the second reactor or the third reactor.

Comparative Example 3

Comparative Example 3 is prepared in the same manner as in Example 1 except that the reaction time in the second reactor is changed to 1 hour thereby lowering the polymerization conversion in the second reactor.

Comparative Example 4

Comparative Example 4 is prepared in the same manner as in Example 2 except that reaction time in the third reactor is changed to 1 hour thereby lowering the polymerization conversion in the third reactor.

The polymerization conditions of Examples 1 to 4 and Comparative Examples 1 to 4 are shown in Tables 1 and 2.

TABLE 1

| (content: parts by weight) | | | Examples | | | |
|---|---|---|---|---|---|---|
| | | | 1 | 2 | 3 | 4 |
| | styrene monomer | | 28 | 30 | 21 | 23 |
| | methyl methacrylate monomer | | 38 | 36 | 45 | 43 |
| | acrylonitrile monomer | | | | 2 | |
| | styrene-butadiene rubber | | | | 12 | |
| | bound styrene content in styrene-butadiene rubber | | 25 wt % | 25 wt % | 15 wt % | 15 wt % |
| | ethyl benzene | | | 20 | | |
| first reactor | temperature | | | 85° C. | | |
| | RPM | | | 120 | | |
| | retention time (hr) | | | 1 | | |
| | polymerization conversion | | 22.5 | 20.4 | 21.7 | 21.3 |
| | refractive index | rubber phase | 1.5367 | 1.5366 | 1.5294 | 1.5288 |
| | | matrix resin | 1.5368 | 1.5388 | 1.5291 | 1.5314 |
| second reactor | temperature | | | 105° C. | | |
| | RPM | | | 100 | | |
| | retention time (hr) | | | 2 | | |
| | additional amount of styrene | | 0.5 | — | 3 | 1 |
| | additional amount of MMA | | — | 3 | — | — |
| | polymerization conversion | | 56.2 | 56.4 | 54.8 | 55.2 |
| | refractive index | rubber phase | 1.5370 | 1.5364 | 1.5286 | 1.5291 |
| | | matrix resin | 1.5365 | 1.5341 | 1.5278 | 1.5273 |
| third reactor | temperature | | | 125° C. | | |
| | RPM | | | 70 | | |
| | retention time (hr) | | | 2 | | |
| | additional amount of styrene | | 2.5 | 3 | 3 | 2 |

TABLE 1-continued

| (content: parts by weight) | | | Examples | | | |
|---|---|---|---|---|---|---|
| | | | 1 | 2 | 3 | 4 |
| | additional amount of MMA | | — | — | — | — |
| | polymerization conversion | | 81.2 | 80.9 | 80.4 | 80.6 |
| | refractive index | rubber phase | 1.5363 | 1.5370 | 1.5295 | 1.5294 |
| | | matrix resin | 1.5369 | 1.5382 | 1.5290 | 1.5283 |

TABLE 2

| (content: parts by weight) | | | Comparative Examples | | | |
|---|---|---|---|---|---|---|
| | | | 1 | 2 | 3 | 4 |
| | styrene monomer | | 28 | 21 | 28 | 30 |
| | methyl methacrylate monomer | | 38 | 45 | 38 | 36 |
| | acrylonitrile monomer | | | 2 | | |
| | styrene-butadiene rubber | | | 12 | | |
| | bound styrene content in styrene-butadiene rubber | | 25 wt % | 15 wt % | 25 wt % | 25 wt % |
| | ethyl benzene | | | 20 | | |
| first reactor | temperature | | | 85° C. | | |
| | RPM | | | 120 | | |
| | retention time (hr) | | | 1 | | |
| | polymerization conversion | | 22.3 | 23.1 | 21.7 | 23.4 |
| | refractive index | rubber phase | 1.5365 | 1.5289 | 1.5362 | 1.5364 |
| | | matrix resin | 1.5369 | 1.5290 | 1.5364 | 1.5370 |
| second reactor | temperature | | | 105° C. | | |
| | RPM | | | 100 | | |
| | retention time (hr) | | 2 | 2 | 1 | 2 |
| | additional amount of styrene | | — | — | 0.5 | — |
| | additional amount of MMA | | — | — | — | 3 |
| | polymerization conversion | | 54.1 | 55.9 | 37.1 | 54.5 |
| | refractive index | rubber phase | 1.5370 | 1.5294 | 1.5367 | 1.5372 |
| | | matrix resin | 1.5322 | 1.5242 | 1.5359 | 1.5361 |
| third reactor | temperature | | | 125° C. | | |
| | RPM | | | 70 | | |
| | retention time (hr) | | 2 | 2 | 2 | 1 |
| | additional amount of styrene | | — | — | 2.5 | 3 |
| | additional amount of MMA | | — | — | — | — |
| | polymerization conversion | | 82.4 | 82.8 | 66.2 | 64.8 |
| | refractive index | rubber phase | 1.5374 | 1.5296 | 1.5371 | 1.5374 |
| | | matrix resin | 1.5302 | 1.5205 | 1.5364 | 1.5371 |

The physical properties of the final products obtained from Examples 1 to 4 and Comparative Examples 1 to 4 are measured as follows, and the results are shown in Table 3.

$$\text{Conversion (\%)} = \frac{\text{solid content} - \text{content of styrene-butadiene rubber}}{(100 - \text{solvent content})} \times 100 \quad (1)$$

(2) Particle size: The size of particles is measured by means of a Mastersizer S Ver 2.14 produced by Malvern Co.

(3) Refractive Index: The refractive index is measured using a 2010M Model produced by Metricon Co.

(4) Izod Impact Strength (⅛", kg·cm/cm): The Izod impact strength is measured in accordance with ASTM D256.
(5) Haze (%): The haze is measured by a Haze meter produced by Nippon Denshoku Co., using a 3 mm thick test sample.
(6) Flowability (g/10 min, 5 kg, 220° C.): The flowability is measured in accordance with ASTM D-1238.
(7) Gloss: The gloss is measured in accordance with ASTM D-523.

TABLE 3

|  | Example | | | | Comparative Example | | | |
| --- | --- | --- | --- | --- | --- | --- | --- | --- |
|  | 1 | 2 | 3 | 4 | 1 | 2 | 3 | 4 |
| rubber particle size (nm) | 196 | 204 | 200 | 210 | 204 | 196 | 270 | 340 |
| Gloss (60°) | 130 | 128 | 131 | 125 | 126 | 131 | 100 | 96 |
| impact strength (kg · cm/cm) | 15.4 | 16.1 | 17.9 | 18.4 | 13.2 | 18.5 | 15.1 | 16.4 |
| Haze (%) | 2.0 | 2.4 | 2.5 | 2.4 | 9.6 | 10.8 | 6.8 | 8.9 |
| flowability (g/10 min) | 34 | 35 | 30 | 32 | 34 | 31 | 33 | 35 |
| refractive index of test sample | 1.5365 | 1.5374 | 1.5293 | 1.5288 | 1.5328 | 1.5224 | 1.5369 | 1.5377 |

Refractive Index of Polymerization Product: The polymerization products from the first reactor, the second reactor and third reactor, respectively, are sampled and dissolved in a solution containing toluene and methyl ethyl ketone (in a volume ratio of 50:50). The dissolved solution is then centrifuged twice by using a centrifugal separator at 25,000 rpm for 1 hour to thereby completely separate the rubber phase and the matrix resin. The refractive indices of the rubber phase and the matrix resin are measured respectively.
Refractive Index of Test Sample: The refractive index of an injection-molded test sample of 100 mm (length) × 100 mm (width) × 3.0 mm (thickness) is measured.

Figure 2:
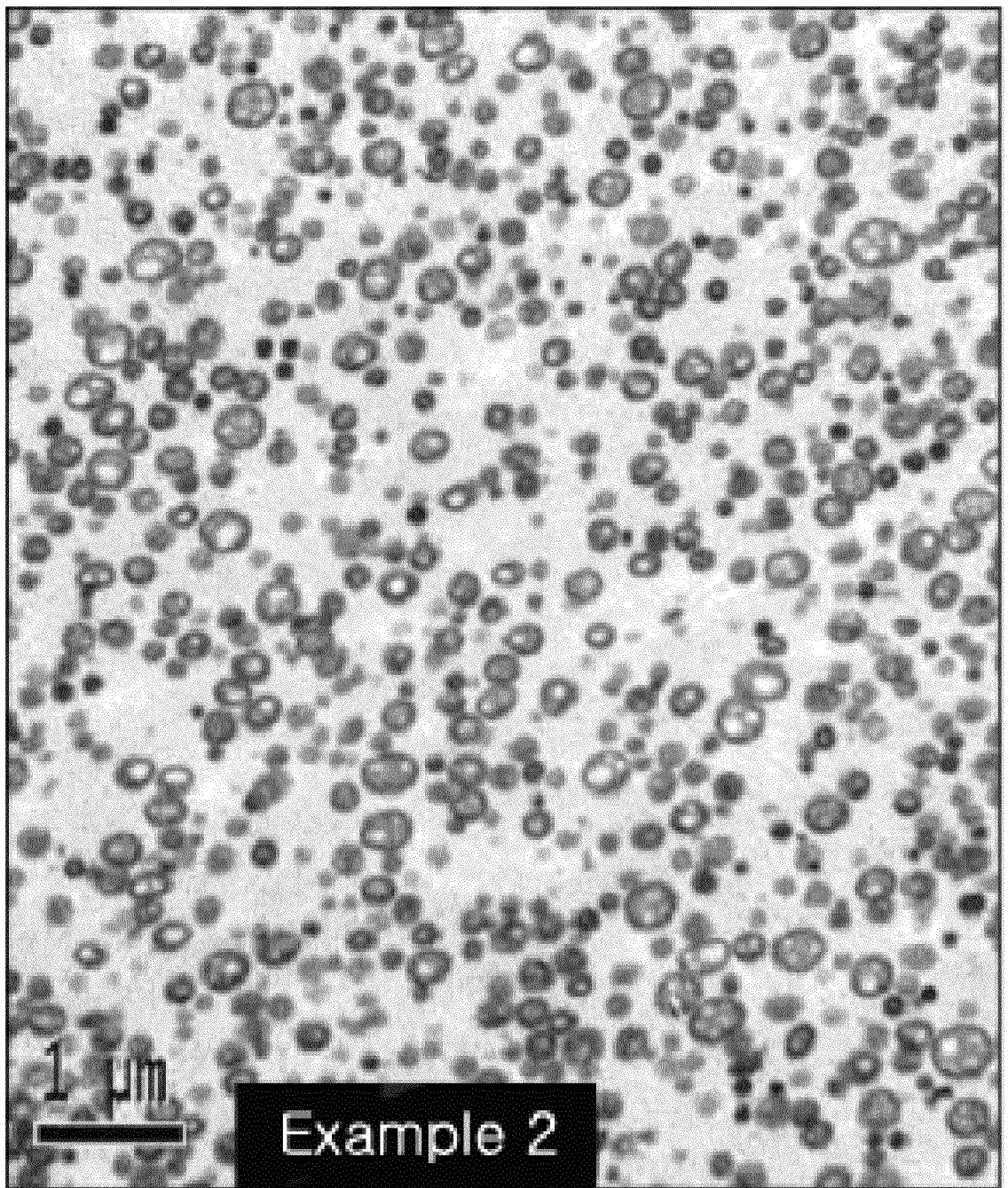
FIG. 2 is an electron micrograph showing particle size and distribution of a transparent resin obtained in Example 2.
Figure 3:
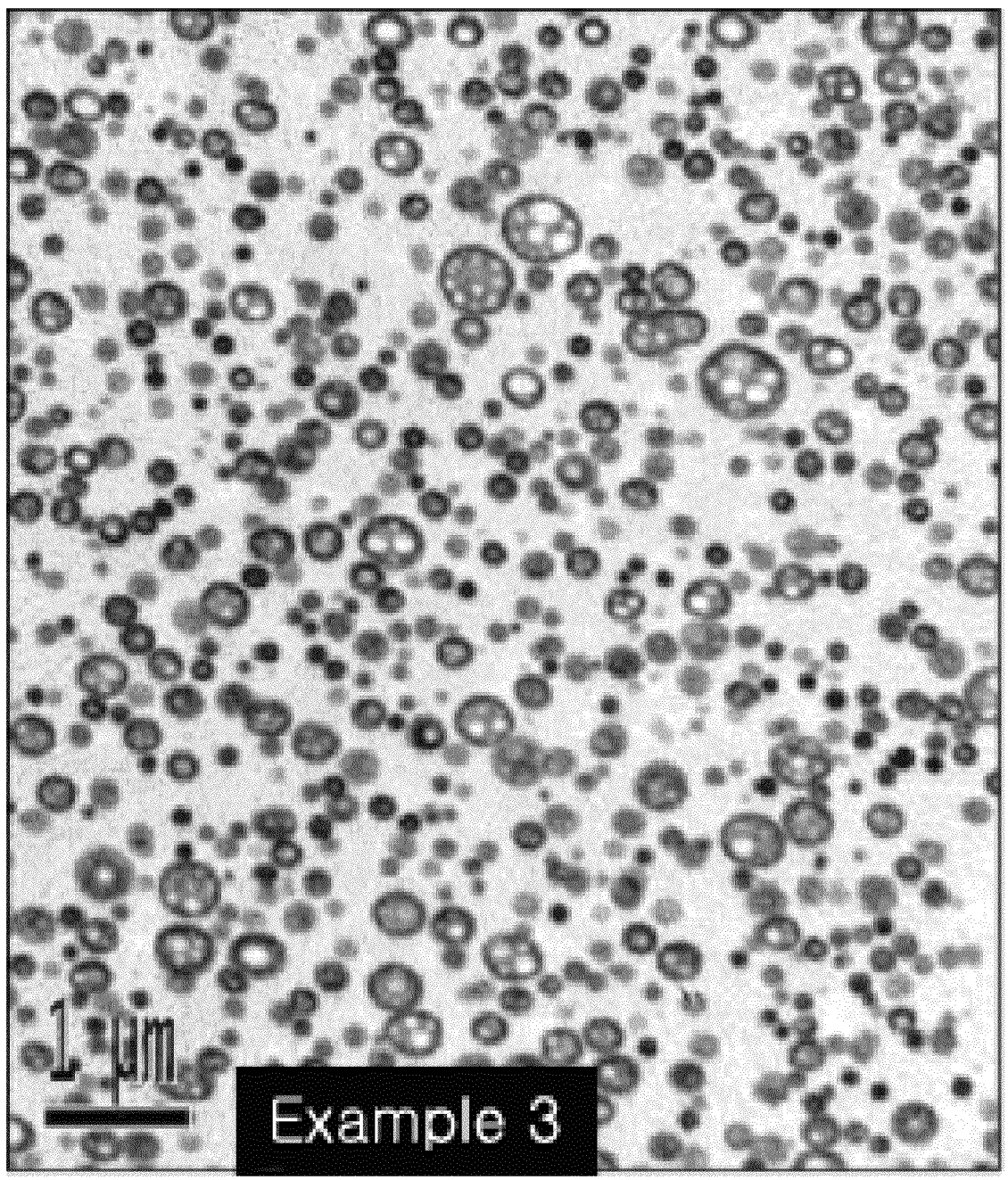
FIG. 3 is an electron micrograph showing particle size and distribution of a transparent resin obtained in Example 3.
Figure 4:
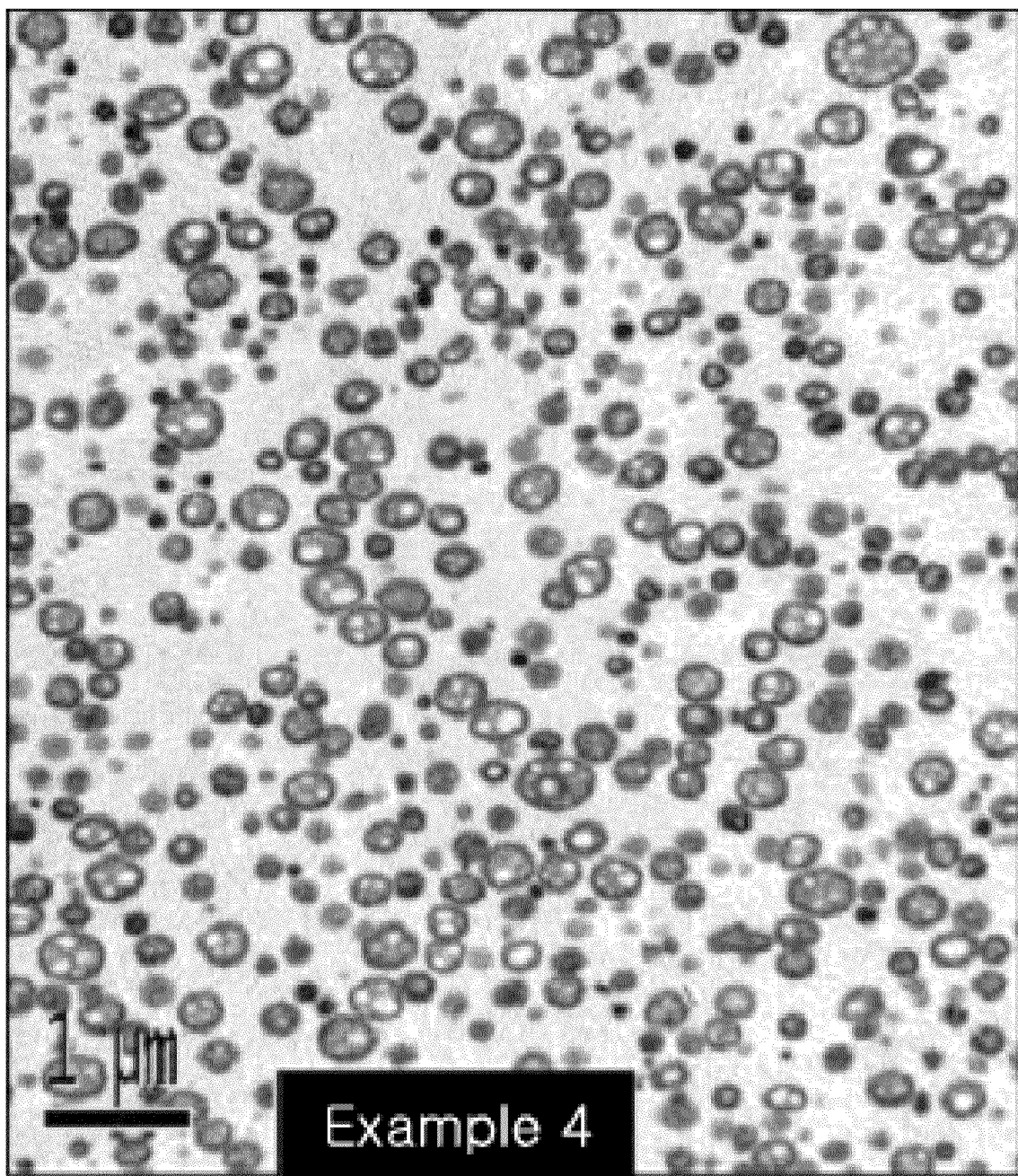
FIG. 4 is an electron micrograph showing particle size and distribution of a transparent resin obtained in Example 4.
Figure 5:
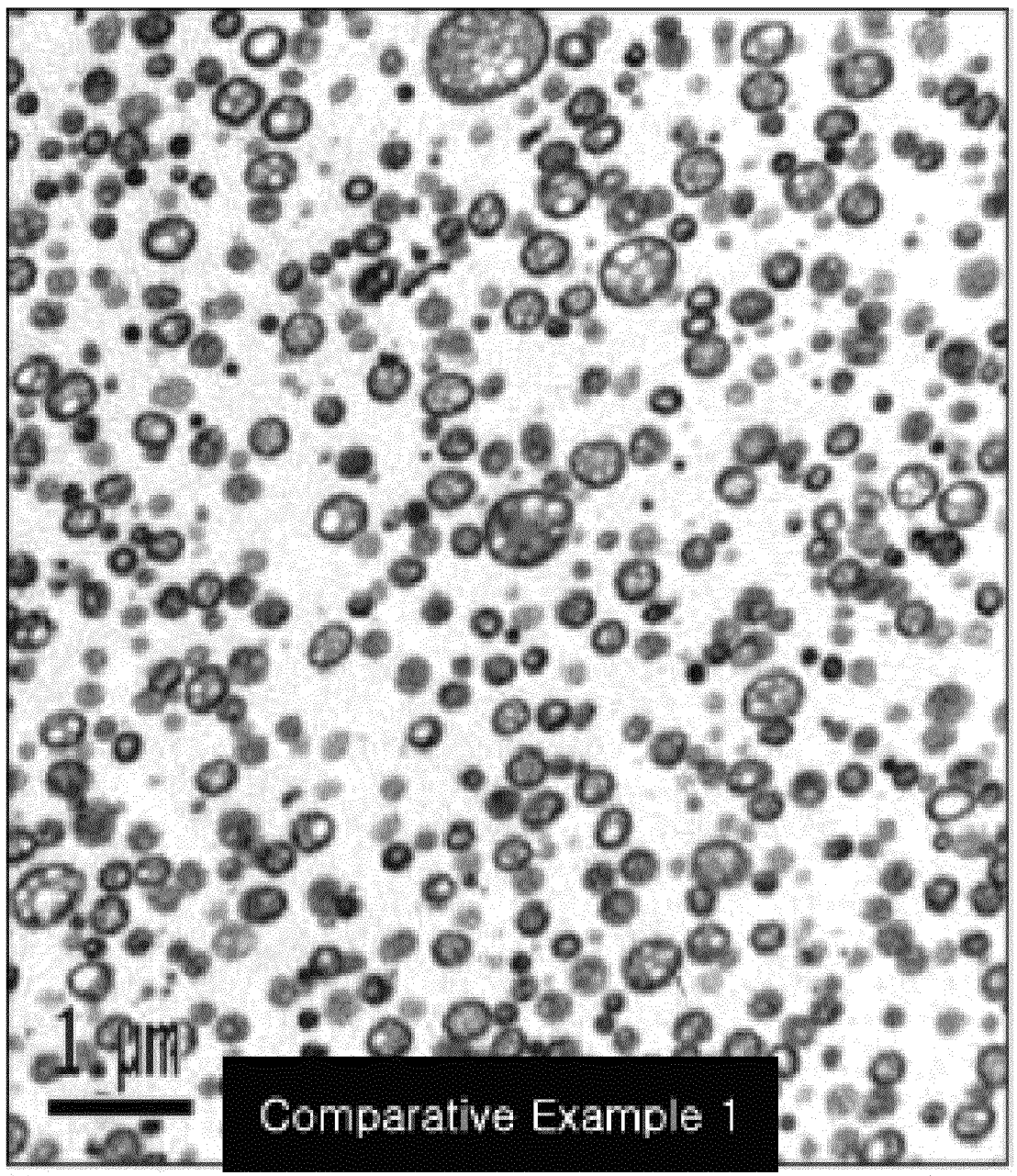
FIG. 5 is an electron micrograph showing particle size and distribution of a transparent resin obtained in Comparative Example 1.
Figure 6:
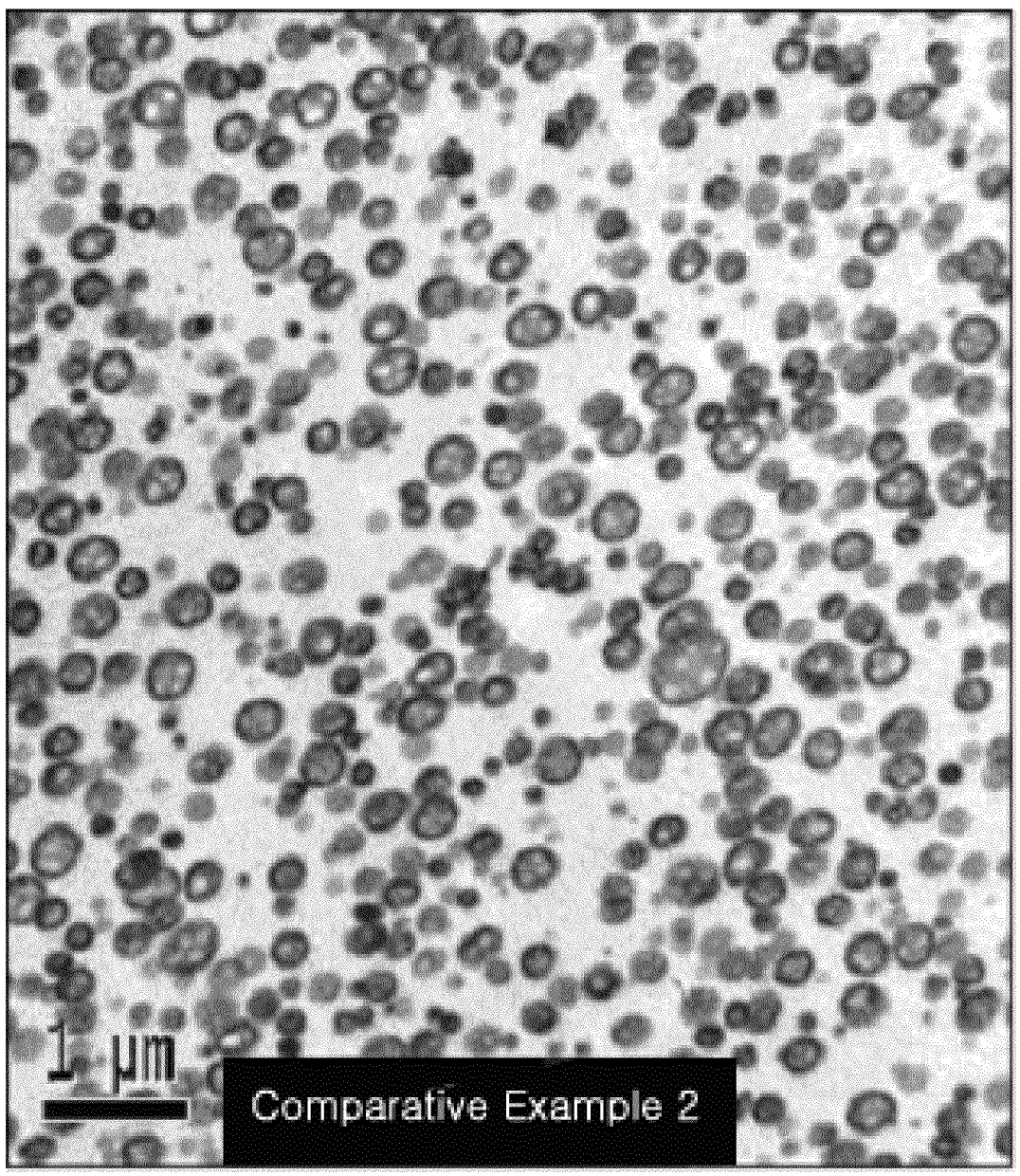
FIG. 6 is an electron micrograph showing particle size and distribution of a transparent resin obtained in Comparative Example 2.
Figure 7:
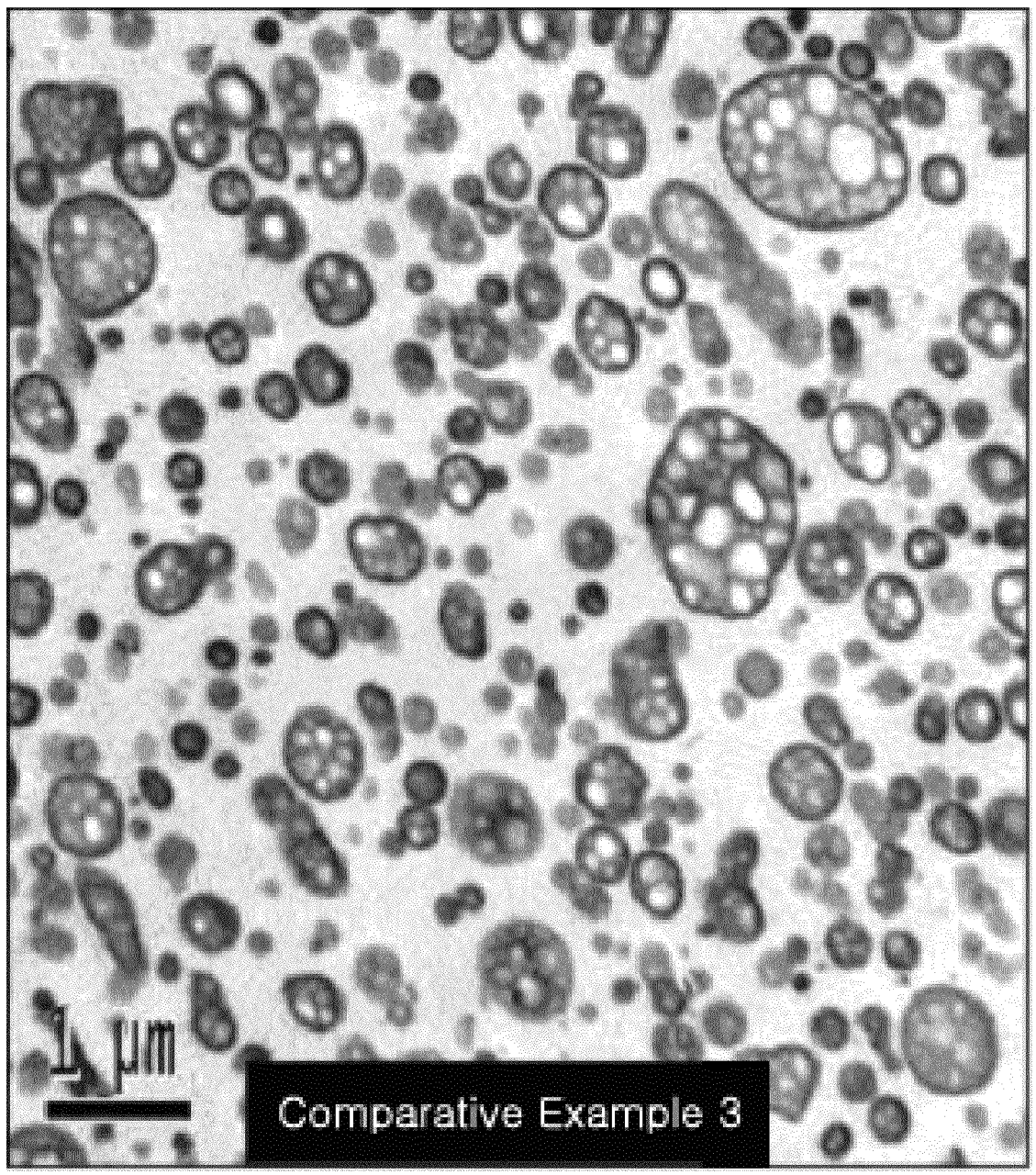
FIG. 7 is an electron micrograph showing particle size and distribution of a transparent resin obtained in Comparative Example 3.
Figure 8:
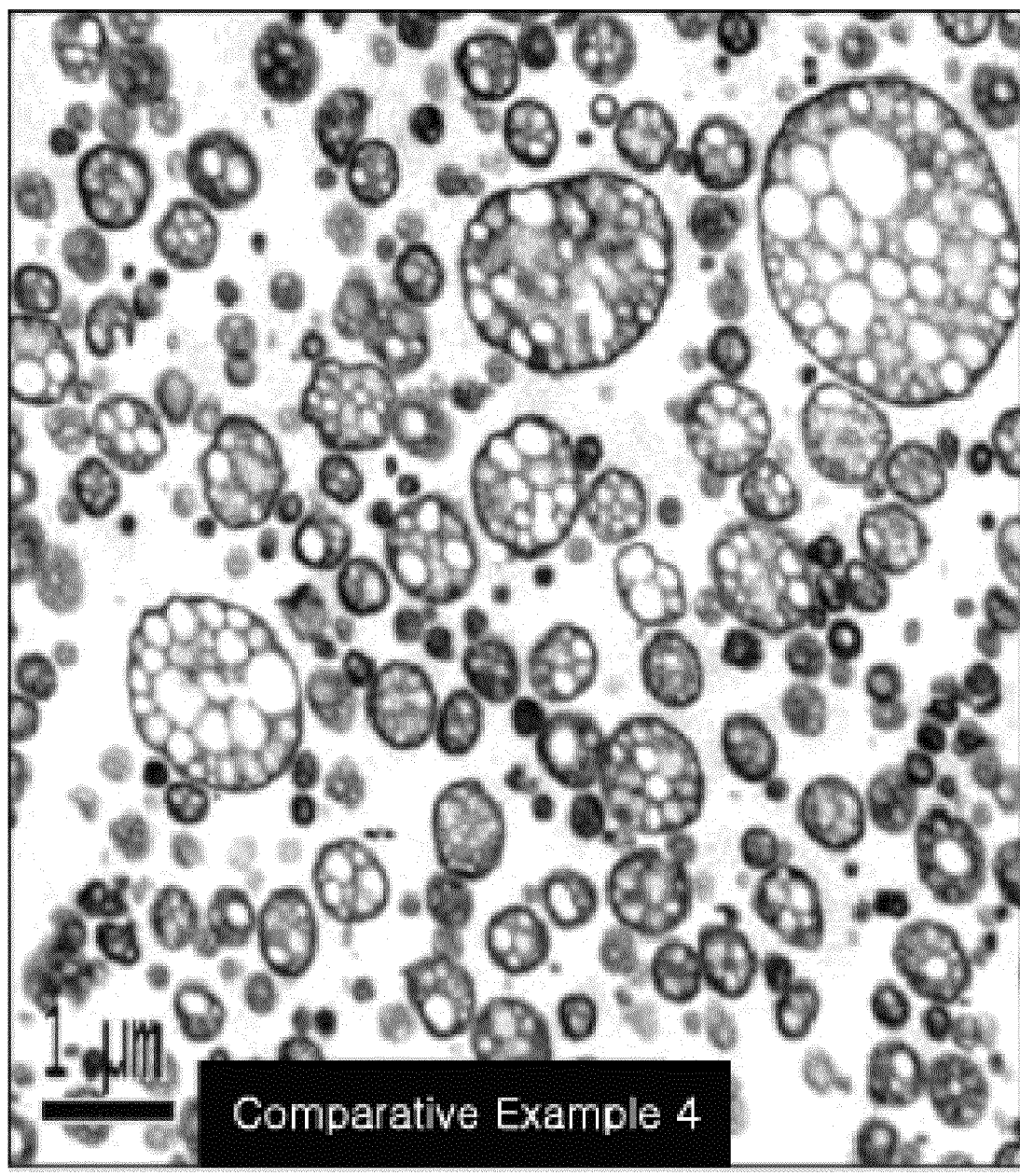
FIG. 8 is an electron micrograph showing particle size and distribution of a transparent resin obtained in Comparative Example 4.

As shown in Table 3 and FIGS. 1 to 8, the resin composition may have excellent impact strength, flowability, gloss and transparency by matching the refractive index of the dispersed phase (rubber) with that of the continuous phase (matrix resin) and optimizing the conversion rate so that the rubber particles may have a uniform morphology.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A transparent rubber-modified styrenic resin composition produced by the process of:
   (1) polymerizing a reactant mixture comprising about 5 to about 30 parts by weight of a styrene-butadiene rubbery copolymer, about 20 to about 40 parts by weight of styrenic monomer, about 30 to about 60 parts by weight of unsaturated carboxylic acid alkyl ester monomer and about 0 to about 15 parts by weight of vinyl cyanide monomer, wherein the amount of styrene-butadiene rubbery copolymer, styrenic monomer, unsaturated carboxylic acid alkyl ester monomer, and vinyl cyanide monomer is based on 100 parts by weight of the total monomers, to a point of phase inversion in a first reactor at a temperature ranging from about 80 to about 130° C. for about 0.5 to about 2 hours to prepare a first polymerization product comprising the rubbery polymer and a matrix resin comprising the styrenic monomer, the unsaturated carboxylic acid alkyl ester monomer and the vinyl cyanide monomer;
   (2) continuously introducing the first polymerization product into a second reactor and polymerizing the first product therein at a temperature ranging from about 100 to about 150° C. for about 1.5 to about 3 hours, while supplying about 0 to about 5 parts by weight of additional styrenic monomer or unsaturated carboxylic acid alkyl ester monomer per 100 parts by weight of the reactant mixture to prepare a second polymerization product comprising the rubbery polymer and a matrix resin comprising the styrenic monomer, the unsaturated carboxylic acid alkyl ester monomer and the vinyl cyanide monomer; and
   (3) continuously introducing the second polymerization product into a third reactor and polymerizing the second product therein at a temperature ranging from about 110 to about 160° for about 1.5 to about 3 hours, while supplying about 0 to about 5 parts by weight of additional styrenic monomer or unsaturated carboxylic acid alkyl ester monomer per 100 parts by weight of the reactant mixture to prepare a third polymerization product comprising the rubbery polymer and a matrix resin comprising the styrenic monomer, the unsaturated carboxylic acid alkyl ester monomer and the vinyl cyanide monomer,
   wherein the difference between the refractive index of the rubbery copolymer and the refractive index of the matrix resin of the third polymerization product is about 0.005 or less and the transparent rubber-modified styrenic resin composition has a haze of about 5% or less as measured by a Nippon Denshoku Haze meter using a 3 mm thick test sample, and
   wherein the process includes adding a combined amount of at least 3 parts by weight additional styrenic monomer, unsaturated carboxylic acid alkyl ester monomer, or both, in the second reactor and the third reactor so that the difference between the refractive index of the rubbery copolymer and the refractive index of the matrix resin of the third polymerization product is about 0.005.

2. The transparent rubber-modified styrenic resin composition of claim 1, wherein said styrene-butadiene rubbery copolymer is a block- or a random-copolymer having a bound styrene content of about 5 to about 50%.

3. The transparent rubber-modified styrenic resin composition of claim 1, wherein said styrenic monomer comprises at least one monomer selected from styrene, α-methyl styrene, α-ethyl styrene, p-methyl styrene, vinyl toluene, or a combination thereof; said unsaturated carboxylic acid alkyl ester monomer comprises at least one monomer selected from methyl methacrylate, ethyl methacrylate, propyl methacrylate, butyl methacrylate, 2-ethylhexyl methacrylate, methyl acrylate, ethyl acrylate, butyl acrylate, 2-ethylhexyl acrylate, or a combination thereof; and said vinyl cyanide monomer comprises at least one monomer selected from acrylonitrile, methacrylonitrile, ethacrylonitrile, or a combination thereof.

4. The transparent rubber-modified styrenic resin composition of claim 1, having a haze of about 0.1 to about 3%.

5. A method for preparing a transparent rubber-modified styrenic resin by continuous bulk polymerization, comprising the steps of:
(1) polymerizing a reactant mixture comprising about 20 to about 40 parts by weight of styrenic monomer, about 30 to about 60 parts by weight of unsaturated carboxylic acid alkyl ester monomer, about 0 to about 15 parts by weight of vinyl cyanide monomer and about 5 to about 30 parts by weight of a styrene-butadiene rubbery copolymer, wherein the amount of styrene-butadiene rubbery copolymer, styrenic monomer, unsaturated carboxylic acid alkyl ester monomer, and vinyl cyanide monomer is based on 100 parts by weight of the total monomers, to a point of phase inversion in a first reactor at a temperature ranging from about 80 to about 130° C. for about 0.5 to about 2 hours to prepare a first polymerization product comprising the rubbery polymer and a matrix resin comprising the styrenic monomer, the unsaturated carboxylic acid alkyl ester monomer and the vinyl cyanide monomer;
(2) continuously introducing the first polymerization product into a second reactor and polymerizing the first product therein at a temperature ranging from about 100 to about 150° C. for about 1.5 to about 3 hours, while supplying about 0 to about 5 parts by weight of additional styrenic monomer or unsaturated carboxylic acid alkyl ester monomer per 100 parts by weight of the reactant mixture to prepare a second polymerization product comprising the rubbery polymer and a matrix resin comprising the styrenic monomer, the unsaturated carboxylic acid alkyl ester monomer and the vinyl cyanide monomer; and
(3) continuously introducing the second polymerization product into a third reactor and polymerizing the second product therein at a temperature ranging from about 110 to about 160° for about 1.5 to about 3 hours, while supplying about 0 to about 5 parts by weight of additional styrenic monomer or unsaturated carboxylic acid alkyl ester monomer per 100 parts by weight of the reactant mixture to prepare a third polymerization product comprising the rubbery polymer and a matrix resin comprising the styrenic monomer, the unsaturated carboxylic acid alkyl ester monomer and the vinyl cyanide monomer,
wherein the difference between the refractive index of the rubbery copolymer and the refractive index of the matrix resin of the third polymerization product is about 0.005 or less and the transparent rubber-modified styrenic resin composition has a haze of about 5% or less as measured by a Nippon Denshoku Haze meter using a 3 mm thick test sample, and
wherein the process includes adding a combined amount of at least 3 parts by weight additional styrenic monomer, unsaturated carboxylic acid alkyl ester monomer, or both, in the second reactor and the third reactor so that the difference between the refractive index of the rubbery copolymer and the refractive index of the matrix resin of the third polymerization product is about 0.005.

6. The method of claim 5, wherein said reactant mixture is a rubber-dissolved solution in which said styrene-butadiene rubbery copolymer is dissolved in a mixed solution comprising styrenic monomer, unsaturated carboxylic acid alkyl ester monomer, vinyl cyanide monomer and a solvent.

7. The method of claim 5, further comprising the step of devolatilizing the third polymerization product through a devolatilizer to remove unreacted monomers and solvent.

8. The method of claim 5, wherein the conversion rate of monomers in the first reactor ranges from about 10 to about 30%, the conversion of monomers in the second reactor ranges from about 40 to about 60%, and the conversion rate of monomers in the third reactor ranges from about 70 to about 90%.

9. The method of claim 5, wherein each polymerization product has a difference of refractive index between the rubbery copolymer and a matrix resin comprising styrenic monomer, unsaturated carboxylic acid alkyl ester monomer and vinyl cyanide monomer of about 0.005 or less.

10. The method of claim 5, wherein said styrene-butadiene rubbery copolymer is a block- or a random-copolymer having a bound styrene content of about 5 to about 50%.

11. The method of claim 6, wherein said solvent is ethyl benzene, benzene, toluene, xylene, methyl ethyl ketone, acetone, n-hexane, chloroform, or cyclohexane.

12. The method of claim 5, wherein each of said polymerization steps is conducted using a polymerization initiator selected from organic peroxides, azo compounds or a combination thereof.

13. The method of claim 12, wherein said polymerization initiator is used in an amount of about 0.02 to about 1 part by weight, per 100 parts by weight of monomers.

14. The method of claim 5, further comprising adding a molecular weight controlling agent in each polymerization step.

15. The method of claim 14, wherein said molecular weight controlling agent is an alkyl mercaptan.

16. The transparent rubber-modified styrenic resin composition of claim 1, wherein the reactant mixture in the first reactor comprises about 30 to 45 parts by weight of the unsaturated carboxylic acid alkyl ester monomer.

17. The transparent rubber-modified styrenic resin composition of claim 1, having a haze of 2.5% or less as measured by a Nippon Denshoku Haze meter using a 3 mm thick test sample.

18. The transparent rubber-modified styrenic resin composition of claim 1, wherein the conversion rate of monomers in the first reactor ranges from about 10 to about 30%, the conversion of monomers in the second reactor ranges from about 40 to about 60%, and the conversion rate of monomers in the third reactor ranges from about 70 to about 90%.

19. The transparent rubber-modified styrenic resin composition of claim 1, wherein the process comprises supplying 0.5 to about 5 parts by weight of styrenic monomer or unsaturated carboxylic acid alkyl ester monomer in said second reactor, said third reactor, or both, so that the difference between the refractive index of the rubbery copolymer and the refractive index of the matrix resin of the third polymerization product is about 0.005.

* * * * *